United States Patent
Cayton et al.

(10) Patent No.: US 10,649,660 B2
(45) Date of Patent: *May 12, 2020

(54) DISAGGREGATING BLOCK STORAGE CONTROLLER STACKS

(71) Applicant: Intel Corporation, Santa Clara, CA (US)

(72) Inventors: Phil C. Cayton, Warren, OR (US); Jay E. Sternberg, North Plains, OR (US); James P. Freyensee, Hillsboro, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,507

(22) Filed: Jun. 11, 2018

(65) Prior Publication Data

US 2019/0138217 A1    May 9, 2019

Related U.S. Application Data

(63) Continuation of application No. 14/998,061, filed on Dec. 24, 2015, now Pat. No. 10,013,168.

(51) Int. Cl.
*G06F 3/06*  (2006.01)

(52) U.S. Cl.
CPC ............ *G06F 3/0607* (2013.01); *G06F 3/064* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | |
|---|---|---|
| 2009/0182962 A1 | 7/2009 | Khmelnitshky et al. |
| 2014/0068200 A1 | 3/2014 | Schnapp et al. |
| 2014/0201562 A1 | 7/2014 | Breakstone et al. |
| 2014/0304461 A1 | 10/2014 | Kitahara et al. |

FOREIGN PATENT DOCUMENTS

WO    2006039711 A1    4/2006

OTHER PUBLICATIONS

International Search Report and Written Opinion for International Application No. PCT/US2016/063551, dated Mar. 13, 2017, 13 pages.
NVM Express, "NVM Express 1.2a", Oct. 23, 2015, 209 pages, NVM Express Inc., USA.
Office Action for U.S. Appl. No. 14/998,061, dated Oct. 6, 2017, 12 pages.
Notice of Allowance for U.S. Appl. No. 14/998,061, dated Mar. 5, 2018, 13 pages.

*Primary Examiner* — Kevin Verbrugge
(74) *Attorney, Agent, or Firm* — Jordan IP Law, LLC

(57) ABSTRACT

Systems, apparatuses and methods may provide for communicating, by a common layer, with a local block storage system and communicating, by a subsystem layer that is communicatively coupled to the common layer, with one or more subsystems. Additionally, the common layer may be disassociated with one or more hardware specific components of the subsystem layer. In one example, the common layer may export one or more callback functions to the subsystem layer, wherein the callback functions include a registration and/or deregistration function.

24 Claims, 3 Drawing Sheets

US 10,649,660 B2

DISAGGREGATING BLOCK STORAGE CONTROLLER STACKS

CROSS-REFERENCE TO RELATED APPLICATIONS

The present application claims the benefit of priority to U.S. Non-Provisional patent application Ser. No. 14/998,061 filed on Dec. 24, 2015.

TECHNICAL FIELD

Embodiments generally relate to memory structures. More particularly, embodiments relate to disaggregating block storage controller stacks.

BACKGROUND

Block storage systems may generally use non-volatile memory (NVM) such as solid state disks (SSDs) to store data in volumes, also referred to as blocks, wherein each block may act as an individual hard drive that is configurable by a storage administrator. Block storage systems that are compliant with NVMe (NVM Express) may connect directly to a PCI-e (Peripheral Components Interconnect Express) bus via a unified software stack having a streamlined register interface and command set designed for NVM-based storage transactions over PCI-e. Tailoring the unified software stack, however, to a particular type of interface (e.g., PCI-e) may limit scalability.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Memory architectures such as, for example, NAND and NOR, EPROM (Erasable Programmable Read Only Memory), PROM (Programmable Read Only Memory), etc., may provide for non-volatile memory (NVM) that is used to store data. Examples of NVM may include, for example, phase change memory (PCM), three dimensional cross point memory, resistive memory, nanowire memory, ferro-electric transistor random access memory (FeTRAM), flash memory such as NAND or NOR, magnetoresistive random access memory (MRAM) memory that incorporates memristor technology, spin transfer torque (STT)-MRAM, and so forth. Moreover, a solid state disk (SSD) drive can have block based NVM such as NAND or NOR and may include byte-addressable write in place memory such as, for example, three dimensional crosspoint memory and MRAM. These memory structures may be particularly useful in datacenter environments such as, for example, high performance computing (HPC) systems, big data systems and other architectures involving relatively high bandwidth data transfers.

Figure 1:
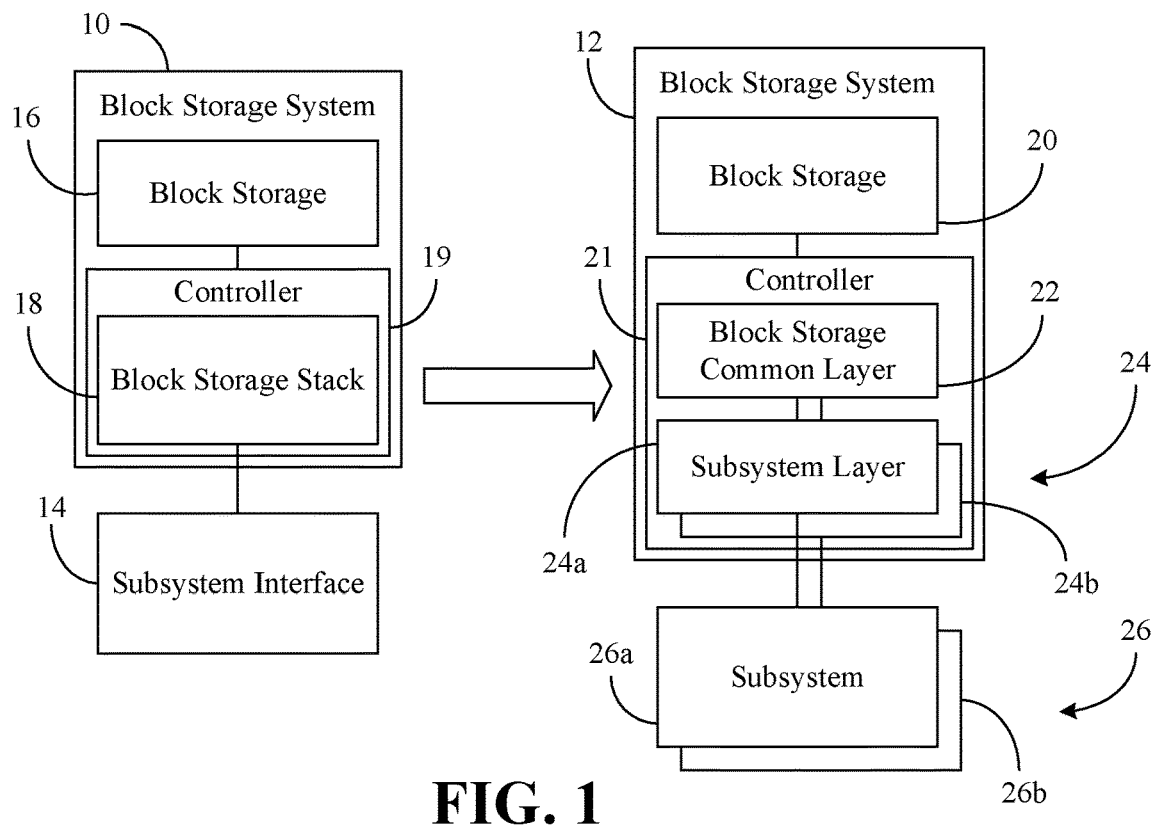
FIG. 1 is a block diagram of an example of a comparison between a conventional block storage controller stack and a disaggregated block storage controller stack according to an embodiment.

Turning now to FIG. 1, a conventional block storage system 10 is shown relative to an enhanced block storage system 12. The conventional block storage system 10 and the enhanced block storage system 12 may be incorporated into a host computer as an SSD, hard disk drive (HDD), etc. In the illustrated example, the conventional block storage system 10 has block storage 16 (e.g., NVM) that is connected directly to a subsystem interface 14 such as, for example, a PCI-e bus, via a unified block storage stack 18 of a controller 19. By contrast, the enhanced block storage system 12 has block storage 20 (e.g., NVM) that is communicatively coupled to a common layer 22 of a controller 21, wherein the common layer 22 is communicatively coupled to one or more subsystem layers 24 (24a, 24b). The subsystem layers 24 may generally connect to different types of subsystems 26 (26a, 26b) having different types of buses, register interfaces, command sets and other hardware specific components. For example, a first subsystem layer 24a may be configured to communicate with a first subsystem 26a in accordance with a PCI-e protocol, whereas a second subsystem layer 24b may be configured to communicate with a second subsystem 26b in accordance with a non-PCI-e protocol.

Of particular note is that the common layer 22 may be considered to be disassociated with the hardware specific components of the subsystem layers 24 to the extent that the common layer 22 is unaware or agnostic to the communication details (e.g., underlying transport mechanism and/or hardware) of the subsystem layers 24. As will be discussed in greater detail, the disassociation may be established by exchanging one or more callback functions (e.g., registration and/or deregistration functions) between the common layer 22 and the subsystem layers 24 to facilitate bidirectional coupling. The callback functions may include a piece of executable code that is passed as an argument to the receiving layer, which is expected to call back (e.g., execute) the argument when appropriate. Thus, in order to register with the common layer 22, each subsystem layer 24 may execute a registration callback function. Similarly, in order to deregister from the common layer 22, each subsystem layer 24 might execute a deregistration callback function. The common layer 22 may also receive exported functions from the subsystem layers 24 and execute registered callbacks in accordance with the exported functions. The enhanced block storage system 12 may therefore be more scalable than the conventional block storage system 10 because the enhanced block storage system 12 may be more adaptable to different types of subsystems 26 (e.g., as they are developed over time). In one example, the enhanced block storage system 12 is an NVMe compliant file system (e.g., NVM Express, Revision 1.2a, Oct. 23, 2015, NVM Express, Inc., nvmexpress.org). The layers 22, 24 may include drivers, shared libraries, etc., as appropriate.

Figure 2:
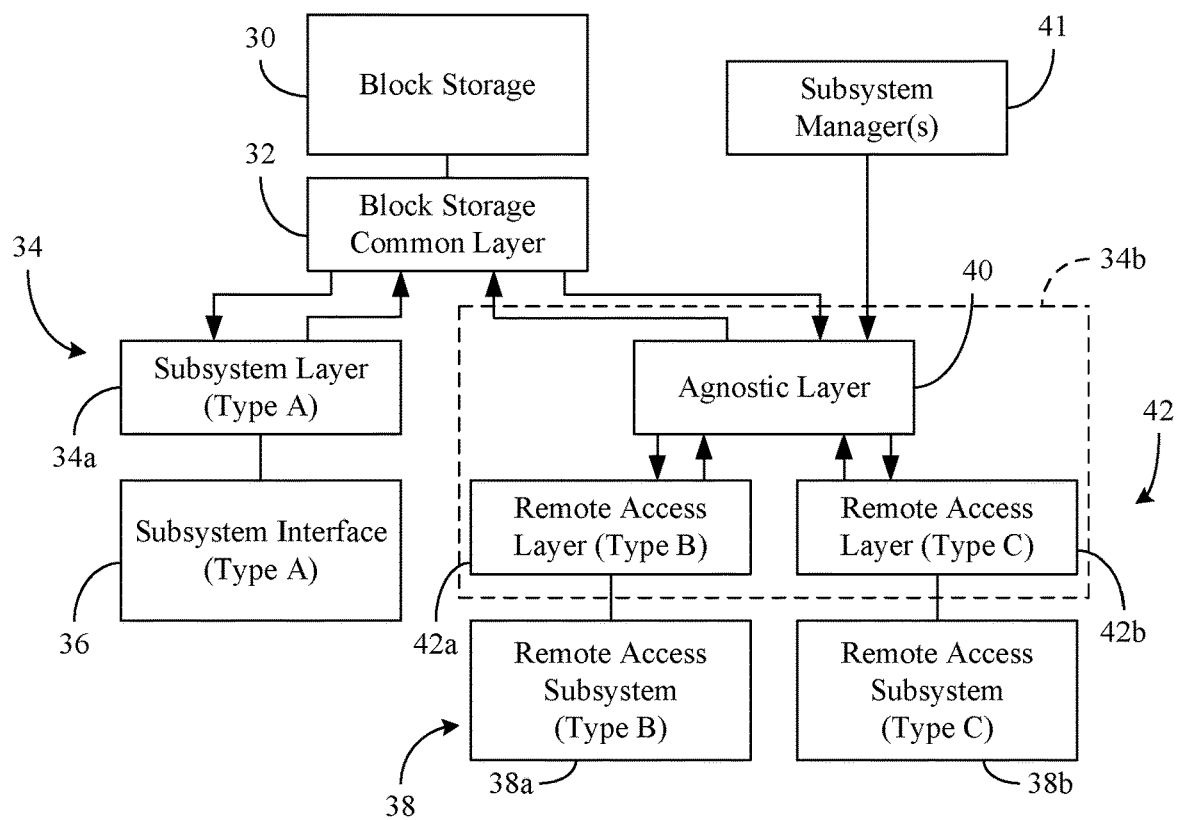
FIG. 2 is a block diagram of an example of a disaggregated block storage controller stack that supports remote access over a fabric connection according to an embodiment.

FIG. 2 shows another example in which block storage 30 (e.g., NVM) is communicatively coupled to a common layer 32, wherein the common layer 32 is communicatively coupled to a plurality of subsystem layers 34 (34a, 34b). In the illustrated example, a first subsystem layer 34a communicates with a subsystem interface 36 of a particular type ("Type A", e.g., PCI-e), whereas a second subsystem layer 34b supports fabric connectivity to a plurality of remote access subsystems 38 (38a, 38b). In this regard, the second subsystem layer 34b may include an agnostic layer 40 to communicate with the common layer 32 and a plurality of remote access layers 42 (42a, 42b) communicatively coupled to the agnostic layer 40.

For example, a first remote access layer 42a may be configured to communicate with a first remote access subsystem 38a in accordance with a first type of remote access protocol ("Type B", e.g., RDMA/Remote Direct Memory Access, INFINIBAND, IWARP, ROCE, etc.), whereas a second remote access layer 42b may be configured to communicate with a second remote access subsystem 38b in accordance with a second type of remote access protocol ("Type C", non-RDMA protocol such as, for example, Fibre Channel). The illustrated agnostic layer 40 disassociates the common layer 32 from one or more network fabric specific components of the remote access layers 42. As will be discussed in greater detail, the disassociation may be established by exchanging one or more callback functions between the remote access layers 42 and the agnostic layer 40 to facilitate bidirectional coupling. For example, the agnostic layer 40 may export callback function(s) to the remote access layers 42 in order to build, send and/or complete requests from the common layer 32. The agnostic layer 40 may also receive exported functions from the remote access layers 42 and execute registered callbacks in accordance with the exported functions. The illustrated block storage 30 may therefore have enhanced scalability due to the ability to adapt to different types of remote access subsystems 38 (e.g., as they are developed over time). In one example, the block storage 30 is part of an NVMe compliant file system (e.g., an SSD integrated into a host computer). Moreover, the agnostic layer 40 may obtain additional connectivity information regarding the remote access subsystems 38 from one or more subsystem managers 41.

Figure 3:
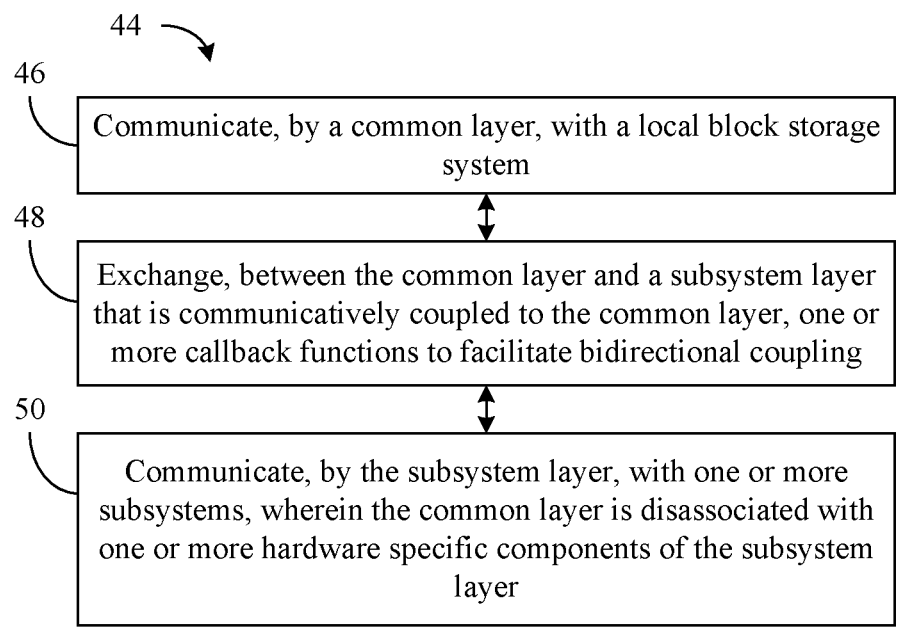
FIG. 3 is a flowchart of an example of a method of operating a block storage system according to an embodiment.

FIG. 3 shows a method 44 of operating a block storage system. The method 44 may generally be implemented in a block storage system such as, for example, the enhanced block storage system 12 (FIG. 1) and/or a system containing the block storage 30 (FIG. 2), already discussed. More particularly, the method 44 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 44 may be written in any combination of one or more operating system applicable/appropriate programming languages, including an object oriented programming language such as JAVA, SMALLTALK, C++ or the like and conventional procedural programming languages, such as the "C" programming language or similar programming languages.

Illustrated processing block 46 provides for communicating, by a common layer, with a local block storage system (e.g., an SSD integrated into a host computer). Block 48 may optionally exchange, between the common layer and a subsystem layer that is communicatively coupled to the common layer, one or more callback functions to facilitate bidirectional coupling, wherein the callback functions may include one or more of a registration function or a deregistration function. Additionally, illustrated block 50 may communicate, by the subsystem layer, with one or more subsystems. As already noted, the common layer may be disassociated with one or more hardware specific components of the subsystem layer. In one example, a plurality of subsystem layers (e.g., of different types) are communicatively coupled to the common layer, wherein the common layer is disassociated with one or more hardware components of each of the plurality of subsystem layers.

Figure 4:
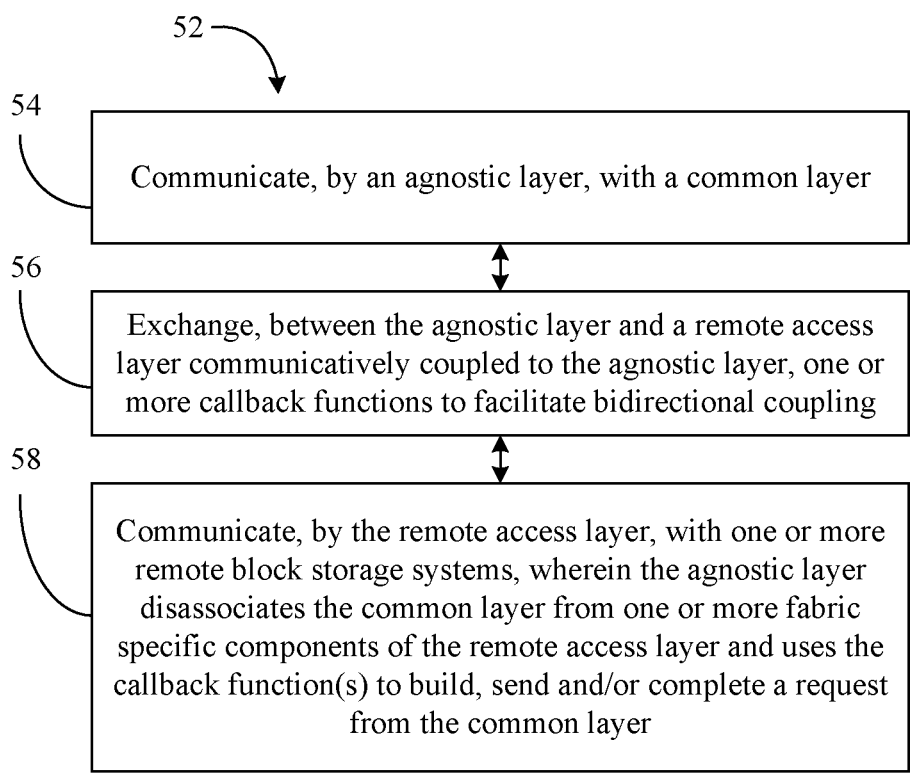
FIG. 4 is a flowchart of an example of a method of operating a subsystem layer according to an embodiment.

FIG. 4 shows a method 52 of operating a subsystem layer. The method 52 may generally be implemented in a block storage system such as, for example, the enhanced block storage system 12 (FIG. 1) and/or a system containing the block storage 30 (FIG. 2), already discussed. More particularly, the method 52 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 54 provides for communicating, by an agnostic layer, with a common layer, wherein block 56 may optionally exchange, between the agnostic layer and a remote access layer communicatively coupled to the agnostic layer, one or more callback functions to facilitate bidirectional coupling. The callback functions may be tailored to a particular type of network fabric associated with the remote access layer. Additionally, illustrated block 58 communicates, by the remote access layer, with one or more remote block storage systems (e.g., via the particular type of network fabric). The illustrated agnostic layer disassociates the common layer from one or more fabric specific components of the remote access layer. In one example, the agnostic layer uses at least one of the one or more callback functions to one or more of build, send and/or complete requests from the common layer. As already noted, a plurality of remote access layers (e.g., of different types) may be communicatively coupled to the agnostic layer, wherein the plurality of remote access layers communicate with a plurality of remote block storage systems and the agnostic layer disassociates the common layer from one or more network fabric specific components of each of the plurality of remote access layers.

Figure 5:
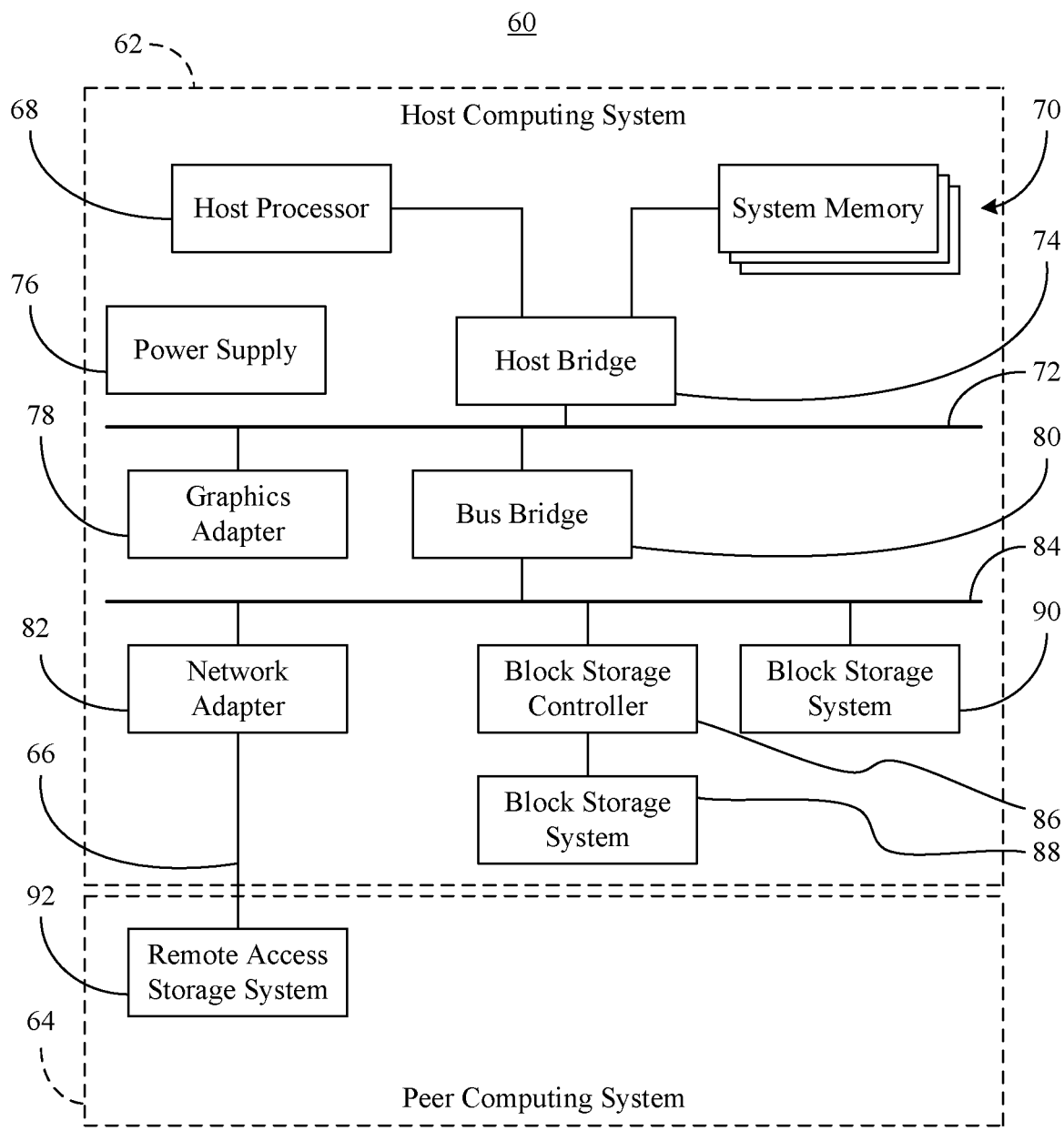
FIG. 5 is a block diagram of an example of a computing system according to an embodiment.

FIG. 5 shows a disaggregated memory architecture 60. The memory architecture 60 may include a host computing system 62 that is coupled to a peer computing system 64 (e.g., in a message passing interface/MPI application, big data analytics application, etc.) via a fabric connection 66 such as, for example, an RDMA protocol (e.g., INFINIBAND, IWARP and/or ROCE). The computing systems 62, 64 may generally be part of electronic devices/platforms having computing functionality (e.g., datacenter, server, personal digital assistant/PDA, notebook computer, tablet computer), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof.

In the illustrated example, the host computing system 62 includes a host processor 68 (e.g., central processing unit/

CPU) and system memory 70 (e.g., DRAM) coupled to a system bus 72 via a host bridge 74 (e.g., PCI-e host bridge). The host processor 68 may execute an operating system (OS) and/or kernel. The host computing system 62 may also include a power supply 76 to provide power to the memory architecture 60 and/or the host computing system 62. The system bus 72 may also be coupled to a graphics adapter 78 and a bus bridge 80 (e.g., PCI-e bus bridge). The illustrated bus bridge 80 is also coupled to an input/output (IO) bus 84 such as, for example, a PCI-e bus. The IO bus 84 may be considered a subsystem interface as described herein. A block storage system 88 may be indirectly coupled to the IO bus 84 via a block storage controller 86. The block storage system 88 and the block storage controller 86 might be compliant with a protocol such as, for example, an SAS (Serial Attached SCSI/Small Computer System Interface) or an SATA (Serial ATA/Advanced Technology Attachment) protocol.

Additionally, a local block storage system 90 may be coupled directly to the IO bus 84, wherein the local block storage system 90 may be an NVM Express (NVMe) compliant file system. In one example, the local block storage system 90 has functionality similar to that of the enhanced block storage system 12 (FIG. 1) and/or a system containing the block storage 30 (FIG. 2), already discussed. Accordingly, the local block storage system 90 may include a common layer communicatively coupled to the local block storage system 90 and a subsystem layer communicatively coupled to the common layer. The subsystem layer may communicate with one or more subsystems such as, for example, the IO bus 84, the block storage system 88 and/or a remote access storage system 92 in the peer computing system 64 via a network adapter 82. The common layer may be disassociated from one or more hardware specific components by the subsystem layer(s).

In the case of the remote access storage system 92, the subsystem layer may include an agnostic layer to communicate with the common layer and a remote access layer communicatively coupled with the agnostic layer. The remote access layer may communicate with the remote access storage system 92, wherein the agnostic layer disassociates the common layer from one or more network fabric specific components of the remote access layer. Accordingly, data may be transferred between the host processor 68, the local block storage system 90, the indirectly connected block storage system 88 and/or the remote access storage system 92 in a scalable and efficient fashion.

Additional Notes and Examples:

Example 1 may include a disaggregated memory architecture comprising a power supply to provide power to the memory architecture, one or more subsystems and a local block storage system including local block storage, a common layer communicatively coupled to the local block storage, and a subsystem layer communicatively coupled to the common layer, the subsystem layer to communicate with the one or more subsystems, wherein the common layer is disassociated with one or more hardware specific components of the subsystem layer.

Example 2 may include the memory architecture of Example 1, wherein the common layer and the subsystem layer are to exchange one or more callback functions to facilitate bidirectional coupling, and wherein the one or more callback functions include one or more of a registration function or a deregistration function.

Example 3 may include the memory architecture of Example 1, wherein the subsystem layer includes an agnostic layer to communicate with the common layer; and a remote access layer communicatively coupled to the agnostic layer, wherein the remote access layer is to communicate with one or more remote block storage systems and the agnostic layer is to disassociate the common layer from one or more network fabric specific components of the remote access layer.

Example 4 may include the memory architecture of Example 3, wherein the agnostic layer and the remote access layer are to exchange one or more callback functions to facilitate bidirectional coupling, and wherein the agnostic layer is to use at least one of the one or more callback functions to one or more of build, send or complete a request from the common layer.

Example 5 may include the memory architecture of any one of Examples 1 to 4, further including a plurality of subsystem layers communicatively coupled to the common layer, wherein the common layer is disassociated with one or more hardware specific components of each of the plurality of subsystem layers.

Example 6 may include the memory architecture of any one of Examples 1 to 4, wherein the local block storage system is an NVM Express compliant file system.

Example 7 may include a block storage stack apparatus comprising a common layer to communicate with a local block storage system and a subsystem layer communicatively coupled to the common layer, the subsystem layer to communicate with one or more subsystems, wherein the common layer is disassociated with one or more hardware specific components of the subsystem layer.

Example 8 may include the apparatus of Example 7, wherein the common layer and the subsystem layer are to exchange one or more callback functions to facilitate bidirectional coupling, and wherein the one or more callback functions include one or more of a registration function or a deregistration function.

Example 9 may include the apparatus of Example 7, wherein the subsystem layer includes an agnostic layer to communicate with the common layer; and a remote access layer communicatively coupled to the agnostic layer, wherein the remote access layer is to communicate with one or more remote block storage systems and the agnostic layer is to disassociate the common layer from one or more network fabric specific components of the remote access layer.

Example 10 may include the apparatus of Example 9, wherein the agnostic layer and the remote access layer are to exchange one or more callback functions to facilitate bidirectional coupling, and wherein the agnostic layer is to use at least one of the one or more callback functions to one or more of build, send or complete a request from the common layer.

Example 11 may include the apparatus of Example 9, further including a plurality of remote access layers communicatively coupled to the agnostic layer, wherein the plurality of remote access layers are to communicate with a plurality of remote block storage systems and the agnostic layer is to disassociate the common layer from one or more network fabric specific components of each of the plurality of remote access layers.

Example 12 may include the apparatus of any one of Examples 7 to 11, further including a plurality of subsystem layers communicatively coupled to the common layer, wherein the common layer is disassociated with one or more hardware specific components of each of the plurality of subsystem layers.

Example 13 may include a method of operating a block storage stack apparatus comprising communicating, by a common layer, with a local block storage system and communicating, by a subsystem layer that is communicatively coupled to the common layer, with one or more subsystems, wherein the common layer is disassociated with one or more hardware specific component of the subsystem layer.

Example 14 may include the method of Example 13, further including exchanging, between the common layer and the subsystem layer, one or more callback functions to facilitate bidirectional coupling, wherein the one or more callback functions include one or more of a registration function or a deregistration function.

Example 15 may include the method of Example 13, further including communicating, by an agnostic layer, with the common layer; and communicating, by a remote access layer that is communicatively coupled to the agnostic layer, with one or more remote block storage systems, wherein the agnostic layer disassociates the common layer from one or more network fabric specific components of the remote access layer.

Example 16 may include the method of Example 15, further including exchanging, between the agnostic layer and the remote access layer, one or more callback functions to facilitate bidirectional coupling, wherein the agnostic layer uses at least one of the one or more callback functions to one or more of build, send or complete a request from the common layer.

Example 17 may include the method of Example 15, wherein the common layer is disassociated with one or more network fabric specific components of each of a plurality of remote access layers that are communicatively coupled to the agnostic layer.

Example 18 may include the method of any one of Examples 13 to 17, wherein the common layer is disassociated with one or more hardware specific components of each of a plurality of subsystem layers that are communicatively coupled to the common layer.

Example 19 may include at least one non-transitory computer readable storage medium comprising a set of instructions, which when executed by a computing device, cause the computing device to communicate, by a common layer, with a local block storage system and communicate, by a subsystem layer that is communicatively coupled to the common layer, with one or more subsystems, wherein the common layer is disassociated with one or more hardware specific components of the subsystem layer.

Example 20 may include the at least one non-transitory computer readable storage medium of Example 19, wherein the instructions, when executed, cause a computing device to exchange, between the common layer and the subsystem layer, one or more callback functions to facilitate bidirectional coupling, and wherein the one or more callback functions include one or more of a registration function or a deregistration function.

Example 21 may include the at least one non-transitory computer readable storage medium of Example 19, wherein the instructions, when executed, cause a computing device to communicate, by an agnostic layer, with the common layer; and communicate, by a remote access layer that is communicatively coupled to the agnostic layer, with one or remote block storage systems, wherein the agnostic layer disassociates the common layer from one or more network fabric specific components of the remote access layer.

Example 22 may include the at least one non-transitory computer readable storage medium of Example 21, wherein the instructions, when executed, cause a computing system to exchange, between the agnostic layer and the remote access layer, one or more callback functions to facilitate bidirectional coupling, and wherein the agnostic layer is to use at least one of the one or more callback functions to one or more of build, send or complete a request from the common layer.

Example 23 may include the at least one non-transitory computer readable storage medium of Example 21, wherein the common layer is to be disassociated with one or more network fabric specific components of each of a plurality of subsystem layers that are communicatively coupled to the agnostic layer.

Example 24 may include the at least one non-transitory computer readable storage medium of any one of Examples 19 to 23, wherein the common layer is to be disassociated with one or more hardware specific components of each of a plurality of subsystem layers that are communicatively coupled to the common layer.

Example 25 may include a block storage stack apparatus comprising means for communicating, by a common layer, with a local block storage system; and means for communicating, by a subsystem layer that is communicatively coupled to the common layer, with one or more subsystems, wherein the common layer is disassociated with one or more hardware specific components of the subsystem layer.

Example 26 may include the apparatus of Example 25, further including means for exchanging, between the common layer and the subsystem layer, one or more callback functions to facilitate bidirectional coupling, wherein the one or more callback functions include one or more of a registration function or a deregistration function.

Example 27 may include the apparatus of Example 25, further including means for communicating, by an agnostic layer, with the common layer; and means for communicating, by a remote access layer that is communicatively coupled to the agnostic layer, with one or more remote block storage systems, wherein the agnostic layer disassociates the common layer from one or more network fabric specific components of the remote access layer.

Example 28 may include the apparatus of Example 27, further including means for exchanging, between the agnostic layer and the remote access layer, one or more callback functions to facilitate bidirectional coupling, wherein the agnostic layer uses at least one of the one or more callback functions to one or more of build, send or complete a request from the common layer.

Example 29 may include the apparatus of Example 27, wherein the common layer is to be disassociated with one or more network fabric specific components of each of a plurality of remote access layers that are communicatively coupled to the agnostic layer.

Example 30 may include the apparatus of any one of Examples 25 to 29, wherein the common layer is to be disassociated with one or more hardware specific components of each of a plurality of subsystem layers that are communicatively coupled to the common layer.

Techniques described herein may therefore enable access to NVMe controller hardware via flexible and ad-hoc connectivity. Additionally, NVMe devices may be able to connect with systems through multiple interfaces. Moreover, operating systems and kernels may be compatible with NVMe storage systems without undergoing standard specific vetting.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A memory architecture comprising:
a power supply to provide power to the memory architecture; and
a local block storage system including:
a local block storage;
a common layer to communicate with the local block storage; and
a first subsystem layer communicatively coupled to the common layer, the first subsystem layer to communicate with one or more subsystems, and to exchange one or more callback functions with the common layer;
wherein the common layer is to be disassociated with one or more hardware specific components of the first subsystem layer and is to receive one or more exported functions from the first subsystem layer;
wherein the common layer is to execute a registered callback function in accordance with the one or more exported functions.

2. The memory architecture of claim 1, wherein:
the first subsystem layer is to execute one of the one or more callback functions to register with the common layer; and
the first subsystem layer is to execute one of the one or more callback functions to deregister with the common layer.

3. The memory architecture of claim 1, further comprising a second subsystem layer that includes:
an agnostic layer to communicate with the common layer; and
a remote access layer communicatively coupled to the agnostic layer, wherein the remote access layer is to communicate with one or more remote block storage systems and the agnostic layer is to disassociate the common layer from one or more network fabric specific components of the remote access layer.

4. The memory architecture of claim 3, wherein the remote access layer is configured to communicate with the one or more remote block storage systems through a remote access protocol.

5. The memory architecture of claim 3, wherein:
the agnostic layer and the remote access layer are to exchange one or more callback functions to facilitate bidirectional coupling;
the agnostic layer is to use at least one of the one or more callback functions, that are exchanged between the agnostic layer and the remote access layer, to one or more of build, send or complete a request from the common layer; and
at least one of the one or more callback functions, that are exchanged between the agnostic layer and the remote access layer, corresponds to a type of network fabric of the remote access layer.

6. The memory architecture of claim 1, wherein the common layer is disassociated with the one or more hardware specific components of the first subsystem layer to be one or more of agnostic to or unaware of a communication protocol utilized by the first subsystem layer to communicate with the one or more subsystems.

7. An apparatus comprising:
a common layer to communicate with a local block storage; and
a first subsystem layer communicatively coupled to the common layer, the first subsystem layer to communicate with one or more subsystems, and to exchange one or more callback functions with the common layer;
wherein the common layer is to be disassociated with one or more hardware specific components of the first subsystem layer and is to receive one or more exported functions from the first subsystem layer;
wherein the common layer is to execute a registered callback function in accordance with the one or more exported functions.

8. The apparatus of claim 7, wherein:
the first subsystem layer is to execute one of the one or more callback functions to register with the common layer; and
the first subsystem layer is to execute one of the one or more callback functions to deregister with the common layer.

9. The apparatus of claim 7, further comprising a second subsystem layer that includes:
an agnostic layer to communicate with the common layer; and
a remote access layer communicatively coupled to the agnostic layer, wherein the remote access layer is to communicate with one or more remote block storage systems and the agnostic layer is to disassociate the common layer from one or more network fabric specific components of the remote access layer.

10. The apparatus of claim 9, wherein the remote access layer is configured to communicate with the one or more remote block storage systems through a remote access protocol.

11. The apparatus of claim 9, wherein:
the agnostic layer and the remote access layer are to exchange one or more callback functions to facilitate bidirectional coupling;
the agnostic layer is to use at least one of the one or more callback functions, that are exchanged between the agnostic layer and the remote access layer, to one or more of build, send or complete a request from the common layer; and
at least one of the one or more callback functions, that are exchanged between the agnostic layer and the remote access layer, corresponds to a type of network fabric of the remote access layer.

12. The apparatus of claim 7, wherein the common layer is disassociated with the one or more hardware specific components of the first subsystem layer to be one or more of agnostic to or unaware of a communication protocol utilized by the first subsystem layer to communicate with the one or more subsystems.

13. A method comprising:
communicating, by a common layer, with a local block storage;
communicating, by a first subsystem layer communicatively coupled to the common layer, with one or more subsystems;
exchanging, by the first subsystem layer, one or more callback functions with the common layer;
disassociating the common layer with one or more hardware specific components of the first subsystem layer;
receiving, by the common layer, one or more exported functions from the first subsystem layer; and
executing, by the common layer, a registered callback function in accordance with the one or more exported functions.

14. The method of claim 13, further comprising:
executing, by the first subsystem layer, one of the one or more callback functions to register with the common layer; and
executing, by the first subsystem layer, one of the one or more callback functions to deregister with the common layer.

15. The method of claim 13, further comprising:
communicating, by an agnostic layer of a second subsystem layer, with the common layer; and
communicating, by a remote access layer of the second subsystem layer, with the agnostic layer;
communicating, by the remote access layer, with one or more remote block storage systems; and
disassociating, by the agnostic layer, the common layer from one or more network fabric specific components of the remote access layer.

16. The method of claim 15, further comprising:
communicating, by the remote access layer, with the one or more remote block storage systems through a remote access protocol.

17. The method of claim 15, further comprising:
exchanging, between the agnostic layer and the remote access layer, one or more callback functions to facilitate bidirectional coupling; and
using, by the agnostic layer, at least one of the one or more callback functions, that are exchanged between the agnostic layer and the remote access layer, to one or more of build, send or complete a request from the common layer;
wherein at least one of the one or more callback functions, that are exchanged between the agnostic layer and the remote access layer, corresponds to a type of network fabric of the remote access layer.

18. The method of claim 13, further comprising:
disassociating the common layer with the one or more hardware specific components of the first subsystem layer so that the common layer is one or more of agnostic to or unaware of a communication protocol utilized by the first subsystem layer to communicate with the one or more subsystems.

19. At least one non-transitory computer readable storage medium comprising a set of instructions, which when executed by a computing device, cause the computing device to:
communicate, by a common layer, with a local block storage;
communicate, by a first subsystem layer communicatively coupled to the common layer, with one or more subsystems;
exchange, by the first subsystem layer, one or more callback functions with the common layer;
disassociate the common layer with one or more hardware specific components of the first subsystem layer;
receive, by the common layer, one or more exported functions from the first subsystem layer; and
execute, by the common layer, a registered callback function in accordance with the one or more exported functions.

20. The at least one non-transitory computer readable storage medium of claim 19, wherein the instructions, when executed, cause the computing device to:
execute, by the first subsystem layer, one of the one or more callback functions to register with the common layer; and
execute, by the first subsystem layer, one of the one or more callback functions to deregister with the common layer.

21. The at least one non-transitory computer readable storage medium of claim 19, wherein the instructions, when executed, cause the computing device to:
communicate, by an agnostic layer of a second subsystem layer, with the common layer;
communicate, by a remote access layer of the second subsystem layer, with the agnostic layer;
communicate, by the remote access layer, with one or more remote block storage systems; and
disassociate, by the agnostic layer, the common layer from one or more network fabric specific components of the remote access layer.

22. The at least one non-transitory computer readable storage medium of claim 21, wherein the instructions, when executed, cause the computing device to:

communicate, by the remote access layer, with the one or more remote block storage systems through a remote access protocol.

23. The at least one non-transitory computer readable storage medium of claim 21, wherein the instructions, when executed, cause the computing device to:
exchange, between the agnostic layer and the remote access layer, one or more callback functions to facilitate bidirectional coupling; and
use, by the agnostic layer, at least one of the one or more callback functions, that are exchanged between the agnostic layer and the remote access layer, to one or more of build, send or complete a request from the common layer;
wherein at least one of the one or more callback functions, that are exchanged between the agnostic layer and the remote access layer, corresponds to a type of network fabric of the remote access layer.

24. The at least one non-transitory computer readable storage medium of claim 19, wherein the instructions, when executed, cause the computing device to:
disassociate the common layer with the one or more hardware specific components of the first subsystem layer so that the common layer is one or more of agnostic to or unaware of a communication protocol utilized by the first subsystem layer to communicate with the one or more subsystems.

\* \* \* \* \*